United States Patent
Liu et al.

(10) Patent No.: US 11,621,908 B2
(45) Date of Patent: Apr. 4, 2023

(54) METHODS, SYSTEMS AND COMPUTER READABLE MEDIA FOR STATELESS SERVICE TRAFFIC GENERATION

(71) Applicant: Keysight Technologies, Inc., Santa Rosa, CA (US)

(72) Inventors: Winston Wencheng Liu, Woodland Hills, CA (US); Matthew R. Bergeron, Sunol, CA (US); Kingshuk Mandal, Kolkata (IN); Alon Regev, Woodland Hills, CA (US); Dan Mihailescu, Mogosoaia (RO); Soumava Das, Kolkata (IN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/319,872

(22) Filed: May 13, 2021

(65) Prior Publication Data
US 2022/0014457 A1    Jan. 13, 2022

Related U.S. Application Data

(60) Provisional application No. 63/059,140, filed on Jul. 30, 2020.

(30) Foreign Application Priority Data

Jul. 13, 2020 (RO) .............................. A 2020 00399

(51) Int. Cl.
*H04L 43/50* (2022.01)
*H04L 43/062* (2022.01)
(Continued)

(52) U.S. Cl.
CPC ............ *H04L 43/50* (2013.01); *H04L 43/062* (2013.01); *H04L 43/0817* (2013.01); *H04L 43/0882* (2013.01)

(58) Field of Classification Search
CPC ....... H04L 43/50; H04L 43/55; H04L 43/062; H04L 43/0817; H04L 43/0882
See application file for complete search history.

(56) References Cited

U.S. PATENT DOCUMENTS

| | | | |
|---|---|---|---|
| 5,937,165 | A | 8/1999 | Schwaller et al. |
| 6,914,892 | B1 | 7/2005 | Cooper et al. |

(Continued)

FOREIGN PATENT DOCUMENTS

| | | |
|---|---|---|
| CN | 101631080 A | 1/2010 |
| CN | 101854268 A | 10/2010 |

(Continued)

OTHER PUBLICATIONS

Final Office Action for U.S. Appl. No. 16/415,790 (dated Dec. 20, 2021).

(Continued)

*Primary Examiner* — Jerry B Dennison

(57) ABSTRACT

The subject matter described herein includes methods, systems, and computer readable media for stateless service traffic generation. A method for stateless service traffic generation occurs at a network equipment test system. The method includes generating, at a first transmit port associated with the network equipment test system, a first test packet flow comprising one or more packets, wherein the first test packet flow indicates a match and action instruction for triggering an action at a second transmit port associated with the network equipment test system; sending the first test packet flow toward a node associated with a data center under test (DCUT); receiving the first test packet flow from the node associated with the DCUT; and performing, using the match and action instruction, the action at the second transmit port associated with the network equipment test system.

16 Claims, 5 Drawing Sheets

(51) Int. Cl.
   *H04L 43/0817* (2022.01)
   *H04L 43/0882* (2022.01)

(56) References Cited

U.S. PATENT DOCUMENTS

| | | | |
|---|---|---|---|
| 7,633,939 | B2 | 12/2009 | Curran-Gray et al. |
| 8,204,497 | B2 | 6/2012 | Huber et al. |
| 8,537,839 | B2 | 9/2013 | Ginti et al. |
| 8,854,961 | B1 | 10/2014 | Cohen |
| 9,219,667 | B2 | 12/2015 | Badea et al. |
| 9,300,565 | B2 | 3/2016 | Robitaille et al. |
| 9,329,960 | B2 | 5/2016 | Chattopadhyay et al. |
| 9,614,689 | B2 | 4/2017 | Cook et al. |
| 9,819,553 | B2 | 11/2017 | Robitaille et al. |
| 9,971,620 | B2 | 5/2018 | Karnes |
| 10,181,912 | B1 | 1/2019 | Callaghan et al. |
| 11,258,719 | B1 | 2/2022 | Sommers |
| 11,502,932 | B2 | 11/2022 | Bergeron |
| 2002/0128811 | A1 | 9/2002 | Hoffman |
| 2005/0041592 | A1 | 2/2005 | Hannel et al. |
| 2008/0294948 | A1 | 11/2008 | Forsbach |
| 2009/0016227 | A1 | 1/2009 | Lin |
| 2009/0207752 | A1 | 8/2009 | Bugenhagen |
| 2011/0064091 | A1 | 3/2011 | Darras et al. |
| 2013/0064095 | A1 | 3/2013 | Chew et al. |
| 2013/0070777 | A1 | 3/2013 | Hutchison et al. |
| 2013/0198569 | A1 | 8/2013 | Eidelman |
| 2014/0258781 | A1* | 9/2014 | Cook ............... H04L 69/329 714/32 |
| 2015/0370675 | A1 | 12/2015 | Chattopadhyay et al. |
| 2016/0234087 | A1 | 8/2016 | Nyerges et al. |
| 2017/0180233 | A1 | 6/2017 | Nistor et al. |
| 2017/0180238 | A1 | 6/2017 | Telle |
| 2017/0214703 | A1 | 7/2017 | Tekchandani |
| 2017/0364794 | A1 | 12/2017 | Mahkonen et al. |
| 2018/0041399 | A1 | 2/2018 | Robitaille et al. |
| 2018/0106702 | A1 | 4/2018 | Fattu et al. |
| 2019/0140893 | A1 | 5/2019 | Artzi et al. |
| 2019/0222481 | A1 | 7/2019 | Hira |
| 2019/0354406 | A1 | 11/2019 | Ganguli et al. |
| 2019/0386924 | A1 | 12/2019 | Srinivasan et al. |
| 2020/0067792 | A1 | 2/2020 | Aktas et al. |
| 2020/0112487 | A1* | 4/2020 | Inamdar ............... H04L 67/14 |
| 2020/0120029 | A1 | 4/2020 | Sankaran et al. |
| 2020/0296023 | A1 | 9/2020 | Kumar et al. |
| 2020/0313999 | A1* | 10/2020 | Lee ............... H04L 69/22 |
| 2020/0326971 | A1 | 10/2020 | Yang |
| 2020/0366588 | A1 | 11/2020 | Bergeron |
| 2020/0366608 | A1 | 11/2020 | Pan et al. |
| 2021/0112002 | A1 | 4/2021 | Pan et al. |
| 2022/0060422 | A1 | 2/2022 | Sommers |

FOREIGN PATENT DOCUMENTS

| | | |
|---|---|---|
| CN | 107749802 A | 3/2018 |
| EP | 3739814 A1 | 11/2020 |

OTHER PUBLICATIONS

Chen et al., "Data Center Congestion Management requirements," https://tools.ietf.org/id/draft-yueven-tsvwg-dccm-requirements-01.html, pp. 1-7 (Jul. 2019).
Byagowi et al., "Bringing the F16 Network into the Lab," Open Platinum, pp. 1-16 (2020).
Byagowi et al., "Bringing the F16 Network into the Lab," OCP Global Summit, Open Platinum, pp. 1-16 (2020).
Non-Final Office Action for U.S. Appl. No. 16/415,790 (dated Jun. 18, 2021).
Non-Final Office Action for U.S. Appl. No. 17/001,614 (dated Apr. 23, 2021).
First Office Action for Chinese Patent Application No. 201810373217.5 (dated Feb. 2, 2021).
Beltman et al., "Collecting telemetry data using P4 and RDMA," University of Amsterdam, pp. 1-12 (2020).
Liu et al., "HPCC++: Enhanced High Precision Congestion Control," Network Working Group, pp. 1-15 (Jun. 17, 2020).
Extended European Search Report for European Application Serial No. 19202282.0 (dated Apr. 7, 2020).
"Traffic Management User Guide (QFX Series and EX4600 Switches)," Juniper Networks, pp. 1-1121 (Mar. 18, 2020).
"H3C S6850 Series Data Center Switches," New H3C Technologies Co., Limited, pp. 1-13 (Mar. 2020).
Even et al, "Data Center Fast Congestion Management," pp. 1-15 (Oct. 23, 2019).
Li et al., "HPCC: High Precision Congestion Control," SIGCOMM '19, pp. 1-15 (Aug. 19-23, 2019).
"RoCE Congestion Control Interoperability Perception vs. Reality," Broadcom White Paper, pp. 1-8 (Jul. 23, 2019).
Commonly-assigned, co-pending U.S. Appl. No. 16/415,790 for "Indirect Testing Using Impairment Rules," (Unpublished, filed May 17, 2019).
"What is RDMA?," Mellanox, pp. 1-3 (Apr. 7, 2019).
Geng et al., "P4QCN: Congestion Control Using P4-Capable Device in Data Center Networks," Electronics, vol. 8, No. 280, pp. 1-17 (Mar. 2, 2019).
Mandal, "In-band Network Telemetry—More Insight into the Network," Ixia, https://www.ixiacom.com/company/blog/band-network-telemetry-more-insight-network, pp. 1-9 (Mar. 1, 2019).
"Understanding DC-QCN Algorithm for RoCE Congestion Control," Mellanox, pp. 1-4 (Dec. 5, 2018).
"Understanding RoCEv2 Congestion Management," Mellanox, https://community.mellanox.com/s/article/understanding-rocev2-congestion-management, pp. 1-6 (Dec. 3, 2018).
"Principles of Chaos Engineering", https://principlesofchaos.org/, pp. 1-2 (May 2018).
"Data Center Quantized Congestion Notification (DCQCN)," Juniper Networks, pp. 1-7 (Oct. 4, 2018).
Mittal et al, "Revisiting Network Support for RDMA," SIGCOMM '18, pp. 1-14 (Aug. 20-25, 2018).
Varadhan et al., "Validating ROCEV2 in the Cloud Datacenter," OpenFabrics Alliance, 13th Annual Workshop 2017, pp. 1-17 (Mar. 31, 2017).
Zhu et al, "ECN or Delay: Lessons Learnt from Analysis of DCQCN and TIMELY," CoNEXT '16, pp. 1-15 (Dec. 12-15, 2016).
Kim et al., "In-band Network Telemetry (INT)," pp. 1-28 (Jun. 2016).
Kim et al., "In-band Network Telemetry via Programmable Dataplanes," pp. 1-2 (2015).
Zhu et al., "Congestion Control for Large-Scale RDMA Deployments," SIGCOMM '15, pp. 1-14 (Aug. 17-21, 2015).
Mittal et al., "TIMELY: RTT-based Congestion Control for the Datacenter," SIGCOMM '15, pp. 1-14 (Aug. 17-21, 2015).
Zhu et al., "Packet-Level Telemetry in Large Datacenter Networks," SIGCOMM '15, pp. 1-13 (Aug. 17-21, 2015).
"Network Functions Virtualization (NFV); Assurance; Report on Active Monitoring and Failure Detection," Draft ETSI GS NFV-REL004, V0.1.1, pp. 1-62 (Jul. 2015).
"RoCE in the Data Center," Mellanox Technologies, White Paper, pp. 1-3 (Oct. 2014).
Barak, "Introduction to Remote Direct Memory Access (RDMA)," http://www.rdmamojo.com/2014/03/31/remote-direct-memory-access-rdma/, pp. 1-14 (Mar. 31, 2014).
Spirent, "Precision Time Protocol (PTP) IEEE 1588," YouTube "alantalkstech", https://www.youtube.com/watch?v=yw-gd01aOYg, pp. 1-11 (Dec. 7, 2011).
"Quick Concepts Part 1—Introduction to RDMA," ZCopy, Education and Sample Code for RDMA Programming, pp. 1-5 (Oct. 8, 2010).
Alizadeh et al., "Data Center TCP (DCTCP)," SIGCOMM '10, pp. 1-12 (Aug. 30-Sep. 3, 2010).
Grochla, "Simulation comparison of active queue management algorithms in TCP/IP networks," Telecommunication Systems, pp. 1-9 (Oct. 2008).
Eidson, "IEEE-1588 Standard for a Precision Clock Synchronization Protocol for Networked Measurement and Control Systems—A Tutorial," Agilent Technologies, pp. 1-94 (Oct. 2005).

(56) References Cited

OTHER PUBLICATIONS

Advisory Action, Examiner-Initiated Interview Summary and AFCP 2.0 Decision for U.S. Appl. No. 16/415,790 (dated Mar. 3, 2022).
Non-Final Office Action for U.S. Appl. No. 16/415,790 (dated May 2, 2022).
Notice of Allowance and Fee(s) Due for U.S. Appl. No. 17/001,614 (dated Sep. 29, 2021).
Notice of Allowance and Fee(s) Due for U.S. Appl. No. 16/415,790 (dated Aug. 25, 2022).
"Wireshark," Wikipedia, http://en.wikipedia.org/wikiWireshark, pp. 1-5 (Aug. 7, 2014).
Byagowi et al., "Bringing the F16 Network into the Lab," Open Platinum, OCP Global Summit, pp. 1-16 (2020).
Notice of Allowance and Fee(s) Due for U.S. Appl. No. 14/311,258 (dated Jan. 4, 2016).
Office Action for European Patent Application Serial No. 19202282.0 (dated Apr. 20, 2022).

* cited by examiner

METHODS, SYSTEMS AND COMPUTER READABLE MEDIA FOR STATELESS SERVICE TRAFFIC GENERATION

PRIORITY CLAIM

This application claims the priority benefit of U.S. Provisional Patent Application Ser. No. 63/059,140, filed Jul. 20, 2020, and Romanian Patent Application Serial No. a 2020 10033, filed Jul. 13, 2020; the disclosures of which are incorporated herein by reference in their entireties.

TECHNICAL FIELD

The subject matter described herein relates to network testing. More particularly, the subject matter described herein relates to methods, systems, and computer readable media for stateless service traffic generation.

BACKGROUND

Network operators typically test network nodes for reliability and other characteristics before deploying the network nodes to production environments (e.g., non-test environments). Generally, it is important to test networks nodes with various amounts of traffic and different types of traffic. For example, a test platform, such as an IxNetwork™ platform manufactured by Keysight, may be usable for network topology testing and traffic analysis and may generate test traffic for testing various network nodes using one or more protocols.

Data centers may be a term for distributed systems (e.g., multiple servers, switches, and/or other devices in same building) used for performing various functions. Within a data center, some nodes may perform centralized functions (e.g., services or microservices, like authentication or data access) involved with handling user traffic or providing services to users. Generally, east-west traffic may refer to intra-data center traffic (e.g., traffic within the data center or nodes thereof) and north-south traffic may refer to traffic that traverses the data center from or to a system physically residing outside the data center, e.g., traffic to or from a user.

While a test platform may attempt to perform testing of a data center, issues can arise when testing data center or distributed system in various scenarios, including east-west traffic or intra-data center traffic scenarios.

SUMMARY

The subject matter described herein includes methods, systems, and computer readable media for stateless service traffic generation. A method for stateless service traffic generation occurs at a network equipment test system. The method includes generating, at a first transmit port associated with the network equipment test system, a first test packet flow comprising one or more packets, wherein the first test packet flow indicates a match and action instruction for triggering an action at a second transmit port associated with the network equipment test system; sending the first test packet flow toward a node associated with a data center under test (DCUT); receiving the first test packet flow from the node associated with the DCUT; and performing, using the match and action instruction, the action at the second transmit port associated with the network equipment test system.

A system for stateless service traffic generation includes a network equipment test system implemented using at least one processor. The network equipment test system is configured for: generating, at a first transmit port associated with the network equipment test system, a first test packet flow comprising one or more packets, wherein the first test packet flow indicates a match and action instruction for triggering an action at a second transmit port associated with the network equipment test system; sending the first test packet flow toward a node associated with a DCUT; receiving the first test packet flow from the node associated with the DCUT; and performing, using the match and action instruction, the action at the second transmit port associated with the network equipment test system.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
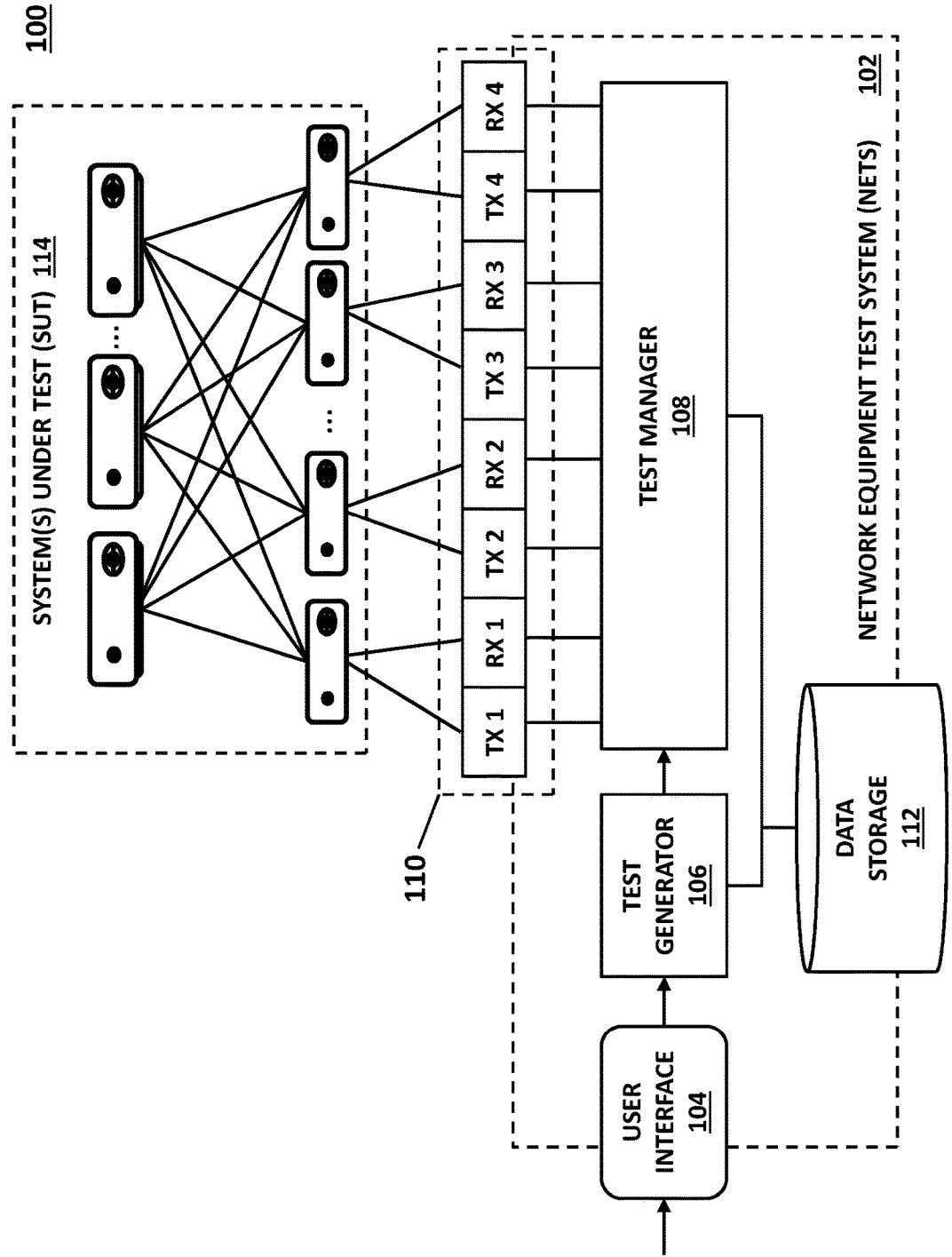
FIG. 1 is a block diagram illustrating an example environment including a network equipment test system for performing various test related operations.

FIG. 1 is a diagram illustrating an example environment 100 including a network equipment test system (NETS) 102 for performing various test related operations. NETS 102 may represent any suitable entity or entities (e.g., one or more testing platforms, nodes, or devices) associated with sending or receiving traffic (e.g., one or more data units). For example, NETS 102 may generate and send test traffic to one or more system(s) under test (SUT) 114, e.g., nodes associated with a data center under test (DCUT). In this example, NETS 102 may receive the test traffic or related traffic from SUT 114 and analyze one or more performance aspects associated with SUT 114.

In some embodiments, NETS 102 may be a stand-alone tool, a testing device, a testing platform, or software executing on at least one processor. In some embodiments, NETS 102 may be a single node or may be distributed across multiple computing platforms or nodes.

In some embodiments, NETS 102 may include one or more modules for performing various functions or operations. For example, NETS 102 may include a network node emulation module for emulating a node or device that communicates with SUT 114.

NETS 102 may include a user interface 104, a test generator 106, a test manager 108, one or more ports 110, and/or data storage 112. In some embodiments, NETS 102 may provide user interface 104 communicating with a test operator and/or another entity. For example, a test operator may be any entity (e.g., an automated system or a device or system controlled or controllable by a human user) for selecting and/or configuring various aspects associated with configuring and/or executing one or more tests. For example, user interface 104 (e.g., an application user interface (API) and a graphical user interface (GUI)) may be provided for providing configuration information, such as a network traffic latency emulation metrics, traffic patterns, service emulation settings, etc. In some embodiments, user interface 104 may support automation (e.g., via one or more scripting languages), a representation state transfer (REST) API, a command line, and/or a web-based GUI.

Test generator 106 may be any suitable entity or entities (e.g., software executing on a processor, an application-specific integrated circuit (ASIC), a field programmable gate array (FPGA), or a combination of software, an ASIC, or an FPGA) for performing one or more aspects associated with generating or synthesizing test sessions, test cases, or related test packets. For example, test generator 106 may receive user input (e.g., a test intent or objective, like a test scenario declaration) via user interface 104 to obtain user intent or other information about a test case. In this example, test generator 106 may use the user input and predefined test case templates or related data to generate one or more test cases and/or test sessions.

In some embodiments, test generator 106 or a related entity may generate one or more test case templates or related test flows based on traffic patterns based on observed live and/or real traffic. For example, live intra-data center traffic flows may be monitored and captured (e.g., entire packets and/or flows may be captured, packet and/or flow meta data may be capture, etc.) and used, at least in part, to construct a statistical traffic model that can be used to test SUT 114. In this example, test generator 106 or a related entity may also use topology information obtained from analysis of the observed traffic data and/or may be provisioned by a test operator or other entity.

In some embodiments, test generator 106 may obtain traffic information associated with SUT 114 from monitoring taps or other sources, e.g., via PCAP files and associated flow metadata (e.g., Netflow records). In such embodiments, test generator 106 or a related entity may analyze the traffic information and generate one or more statistical traffic models which characterize SUT related traffic (e.g., data center east-west traffic) at different times and workloads. In some embodiments, one or more statistical traffic models may be manually constructed by a user and loaded into the system, e.g., via user interface 104.

In some embodiments, test generator 106 or a related entity may use learned traffic models to generate test case templates and/or test flows for testing SUT 114 in various scenarios. For example, a traffic model may include or generate templates or characterizations indicative of real-world workloads performed (e.g., micro-services) within a data center.

In some embodiments, test generator 106 or a related entity may use a traffic model (e.g., a statistical data model) to construct or determine an organized set of match and action instructions that are carried in test packets to emulate various intra-SUT traffic flows and/or workloads. For example, test generator 106 or a related entity may generate various low-level test system component configuration instructions using topology information and traffic model information. In this example, the configuration instructions may be used by a test manager 108 that provisions and/or manages various test system components, e.g., prior to or concurrently with testing SUT 114.

Test manager 108 may be any suitable entity or entities (e.g., software executing on a processor, an ASIC, an FPGA, or a combination of software, an ASIC, or an FPGA) for performing one or more aspects associated with test session configuration and related management. For example, test manager 108 may receive test case information, e.g., configuration instructions associated with a test case and may provision or provide the configuration instructions to various test system components, e.g., ports 110. In this example, the configuration instructions may be communicated to various test system components via an internal physical or virtual bus.

Ports 110 may include or utilize any suitable entity or entities (e.g., one or more network interface cards (NICs), physical processors, and/or other hardware) for sending or receiving communications. For example, NETS 102 or test manager 108 may use one or more multiple ports 110 (e.g., communications interfaces) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 110 may include various hardware and/or software that is configurable for processing, generating, sending, and/or receiving test traffic. For example, ports 110 or components therein may be configured or provisioned by test manager 108 or configuration instructions received therefrom. In this example, the configuration instructions may also include interpretation logic for interpreting match and action instructions and/or other upstream dependency data in test packets generated from other ports 110.

In some embodiments, ports 110 may include multiple port modules for interacting with SUT 114. For example, each port module may include one or more transmit ports for sending test packets to SUT 114 or a node thereof and one or more receive ports for receiving test packets back from SUT 114 or a node thereof. In this example, each port module may be associated with a particular application, service, test flow, and/or IP address and port.

In some embodiments, NETS 102 and/or related entities may be configured to emulate east-west traffic (e.g., intra-data center traffic). For example, NETS 102 may configure ports 110 to generate test packets with various upstream dependency data (e.g., match and action instructions) so that the test traffic emulates the cascading nature of micro-services workloads that operate within a DCUT. In this example, an initial request associated with micro-service A may be received by a port of NETS 102 acting as an end node that provides micro-service A. The port of NETS 102 may utilize upstream dependency data in the request to trigger the generation of a second, related micro-service B request message, which is transmitted, via SUT 114 (e.g., a node in a DCUT), to another port of NETS 102 acting as an end node that provides micro-service B. Continuing with the example, receipt of the micro-service B request message may trigger the generation of multiple, related micro-service C request messages, which are then transmitted, via SUT 114, to multiple ports of NETS 102 acting as end nodes that provide micro-service C.

In some embodiments, each of ports 110 may include or access data storage 112 and/or local memory. In some embodiments, after receiving test packets or related messages from SUT 114, one or more of ports 110 may be configured to generate various performance metrics or related statistics. In such embodiments, performance metrics may include latency and packet drops.

SUT 114 may be any suitable entity or entities (e.g., devices, systems, or platforms) for communicating with NETS 102 and/or receiving, processing, forwarding, and/or sending test traffic or other data. For example, SUT 114 may include a network router, a network switch, a network device, a server, or a network controller. In another example, SUT 114 may include one or more systems and/or computing platforms, e.g., a data center or a group of servers and/or routers. In yet another example, SUT 114 may include one or more networks or related components, e.g., an access network, a core network, or the Internet.

In some embodiments, NETS 102 may include functionality for accessing data storage 112. Data storage 112 may be any suitable entity or entities (e.g., a storage device, a non-transitory computer readable medium, or a storage system) for maintaining or storing information related to testing and/or related metrics. For example, data storage 112 may contain traffic models, test cases, test session data, topology information for SUT 114, and/or other information usable for generating performance metrics (e.g., statistics) associated with one or more aspects of SUT 114. In some embodiments, data storage 112 may be located at NETS 102, another node, or distributed across multiple platforms or devices.

It will be appreciated that FIG. 1 is for illustrative purposes and that various nodes and/or modules, locations, and/or functionality described above in relation to FIG. 1 may be changed, altered, added, or removed.

Figure 2:
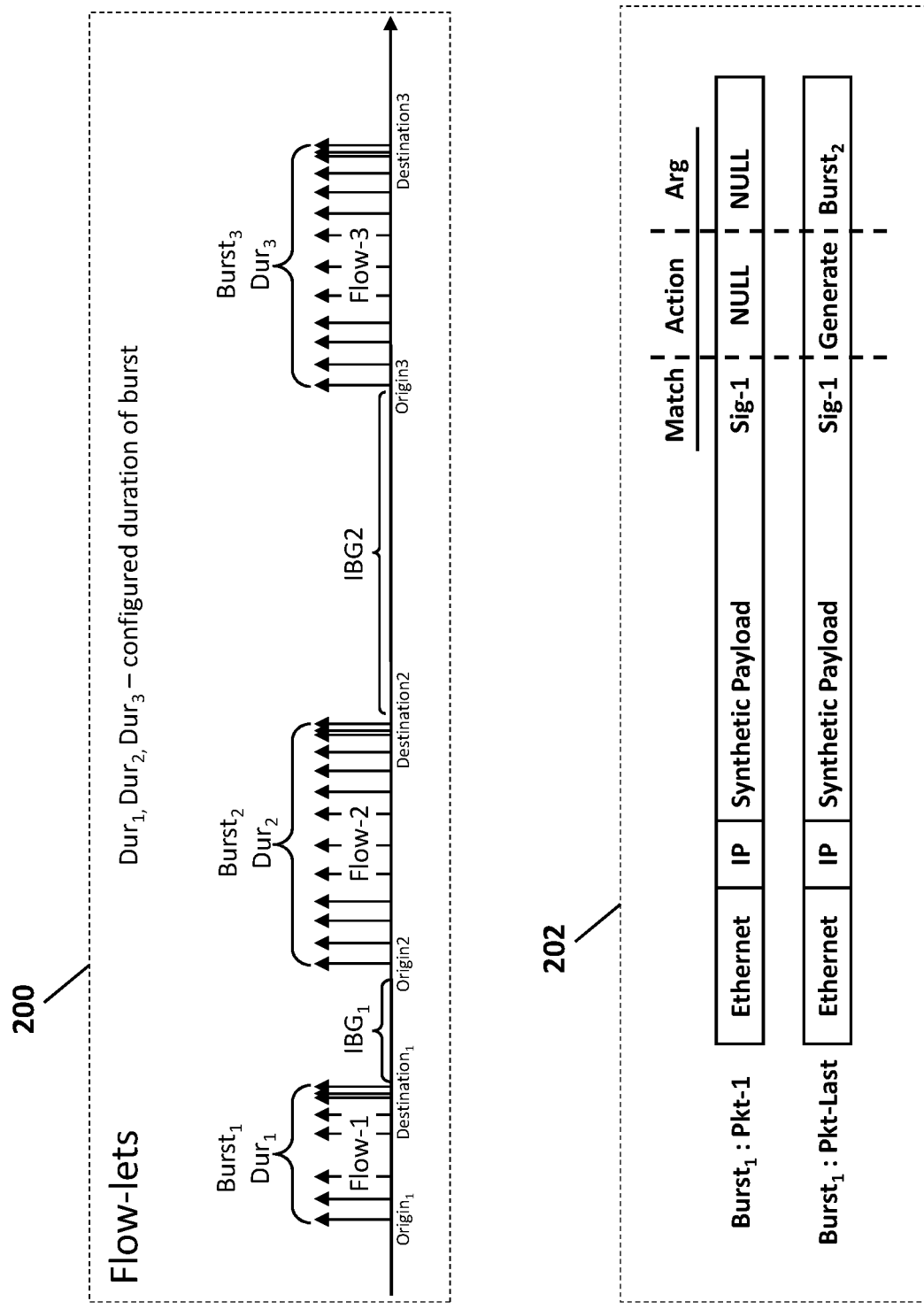
FIG. 2 shows two diagrams illustrating test traffic characteristics.

FIG. 2 includes two diagrams illustrating test traffic characteristics. FIG. 2 includes a flow-let diagram 200 illustrating interdependency between three test traffic bursts (e.g., packets sent in a short amount of time) or flows (e.g., related packets). In diagram 200, a set of interdependent flow-lets (flow-lets) are depicted including a first burst ($Burst_1$) having a configured (e.g., predetermined) duration ($Dur_1$) that is associated with a first test traffic flow (Flow-1) between a source ($Origin_1$) and a destination ($Destination_1$), a second burst ($Burst_2$) having a configured duration ($Dur_2$) that is associated with a second test traffic flow (Flow-2) between a source ($Origin_2$) and a destination ($Destination_2$), and a third burst ($Burst_3$) having a configured duration (Dura) that is associated with a third test traffic flow (Flow-3) between a source ($Origin_3$) and a destination ($Destination_3$). Inter-burst gap ($IBG_1$) is shown between the first burst and the second burst and inter-burst gap ($IBG_2$) is shown between the second burst and the third burst.

In some embodiments, a traffic generation engine may be configured to generate multiple point-to-point bursts. In such embodiments, the traffic generation engine may generate bursts between multiple source and destination pairs, e.g., like the flows in diagram 200. One example scenario represented by diagram 200 may be as follows: $Burst_1$ may represent north-south traffic for requesting a service by providing a username and a password; $Burst_2$ may represent east-west traffic for validating the user credentials (e.g., $Burst_2$ may have to wait until the password arrives); and $Burst_3$ may represent east-west traffic for pulling advertisements for the user (e.g., $Burst_3$ may have to wait until credential validation is successful).

If a traffic generation engine does not utilize match and action programming or related functionality then test traffic may fail to realistically emulate interdependency between one or more flows, e.g., east-west traffic in a DCUT. For example, a traffic generation engine without upstream dependency functionality may generate traffic bursts based on predetermined time intervals, but not based on upstream actions or related responses In contrast, in some embodiments, a traffic generation engine with upstream dependency functionality (e.g., match and action programming) can be used to emulate real-world interdependency scenarios (e.g., a credential validation failure or success situation). For example, a test packet may include or indicate a match and action instruction for triggering $Burst_3$ for emulating a credential validation success situation. In this example, a test generation engine or related entity may wait to generate and send $Burst_3$ after the test packet is received back from SUT 114. In another example, a test packet may include or indicate a match and action instruction for triggering an error message to be sent for emulating a credential validation failure situation. In this example, a test generation engine or related entity may never send $Burst_3$ in response to the error message or may wait until a subsequent test packet is received with a match and action instruction for triggering $Burst_3$.

It will be appreciated that diagram 200 is for illustrative purposes and that various aspects and/or functionality described above in relation to diagram 200 may be changed, altered, added, or removed.

FIG. 2 includes a diagram 202 illustrating two test packets with match and action instructions. In diagram 202, a first packet of $Burst_1$ may include or indicate a match portion (Sig-1) which may represent one or more packet characteristics (e.g., an IP based 5-tuple), an action portion for representing a triggerable action, and an argument portion for representing additional information for the triggered action. In diagram 202, a last packet of $Burst_1$ may include or indicate a same match portion (Sig-1) but a different action portion for representing a triggerable action, and an argument portion for representing additional information for the triggerable action. Example triggerable actions may include initiating a packet burst or flow, defining or modifying packet size characteristics, regulating a burst or flow rate, stopping a flow, defining or modifying a burst duration, defining or modifying packet header characteristics, and/or defining or modifying packet payload characteristics. Example additional information for triggerable actions may include latency amounts, burst or distribution patterns, number of test packets, repetition information, test packet sizes, packet header information, or other information.

It will be appreciated that diagram 202 is for illustrative purposes and that functionality described above in relation to diagram 202 may be changed, altered, added, or removed.

Figure 3:
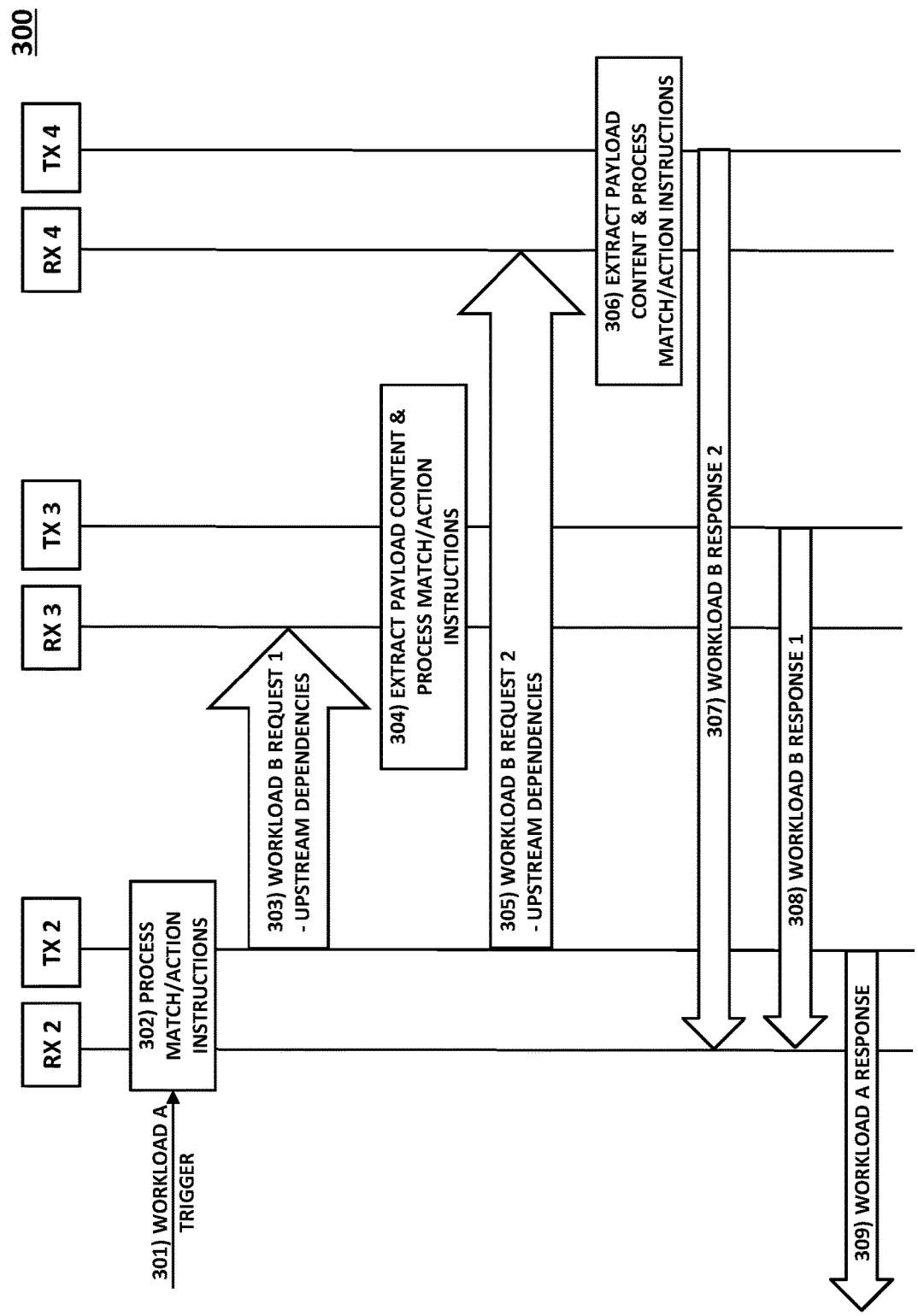
FIG. 3 is a message flow diagram illustrating handling test packets containing match and action instructions.

FIG. 3 is a message flow diagram illustrating an example process 300 for handling test packets containing upstream dependency data. In some embodiments, request and response messages may represent test packets for emulating east-west traffic or intra-SUT traffic. For example, request and response messages may relate to one or more microservices performed by a data center or node(s) therein. In this example, one or more test packets may include multiple hierarchically organized or nested match action instructions that direct NETS 102 or related entities to create multiple, cascading flows across multiple test system ports, which realistically emulate intra-data center E-W traffic patterns.

In some embodiments, upstream dependency data may include, but is not limited to, match and action instructions that can trigger actions (e.g., test traffic related actions) at upstream entities, e.g., a port of NETS 102 that receives a test packet via SUT 114. In some embodiments, upstream entities that may extract or obtain and use upstream dependency data may include various test system components or entities associated with NETS 102, including, for example, ports 110. For example, upstream dependency data effectively enables in-band communication between transmit and receive ports (e.g., physical hardware ports, virtual ports, or both) of NETS 102. In this example, an upstream service or related node may behave in accordance with a latency distribution associated with a particular traffic model and may be controlled or triggered, at least in part, using received upstream dependency data.

Referring to FIG. 3, in step 301, a receive port (RX 2) of NETS 102 may receive a request or trigger message associated with a workload A. For example, an initiating request message may be received via an internal communications path from test manager 108. In this example, the initiating request may include upstream dependency data (e.g., match and action instructions).

In step 302, upstream dependency data (e.g., match and action instructions and/or packet generation instructions) contained in the request message may be obtained and interpreted into one or more actions for a transmit port (TX 2) of NETS 102.

In step 303, a first workload B request message (Workload B Request 1) may be sent from TX 2 to a receive port (RX 3) of NETS 102 via SUT 114 (e.g., a data center node).

In step 304, upstream dependency data (e.g., match and action instructions and/or packet generation instructions) contained in the first workload B request message may be obtained and interpreted into one or more actions for a transmit port (TX 3) of NETS 102.

In step 305, a second workload B request message (Workload B Request 2) may be sent from TX 2 to a receive port (RX 4) of NETS 102 via SUT 114 (e.g., a data center node).

In step 306, upstream dependency data (e.g., match and action instructions and/or packet generation instructions) contained in the second workload B request message may be obtained and interpreted into one or more actions for a transmit port (TX 4) of NETS 102.

In step 307, a second workload B response message (Workload B Response 2) may be sent from TX 4 to RX 2 via SUT 114 (e.g., a data center node).

In step 308, a first workload B response message (Workload B Response 1) may be sent from TX 3 to RX 2 via SUT 114 (e.g., a data center node).

In step 309, after receiving both workload B response messages, a response message associated with a workload A may be sent from TX 2 to another entity, e.g., a receive port (RX 1) of NETS 102.

It will be appreciated that FIG. 3 is for illustrative purposes and that different and/or additional steps other than those depicted in FIG. 3 may occur. Further, it will be appreciated that some steps may occur in a different order than depicted in FIG. 3 and that functionality described above in relation to FIG. 3 may be changed, altered, added, or removed.

Figure 4:
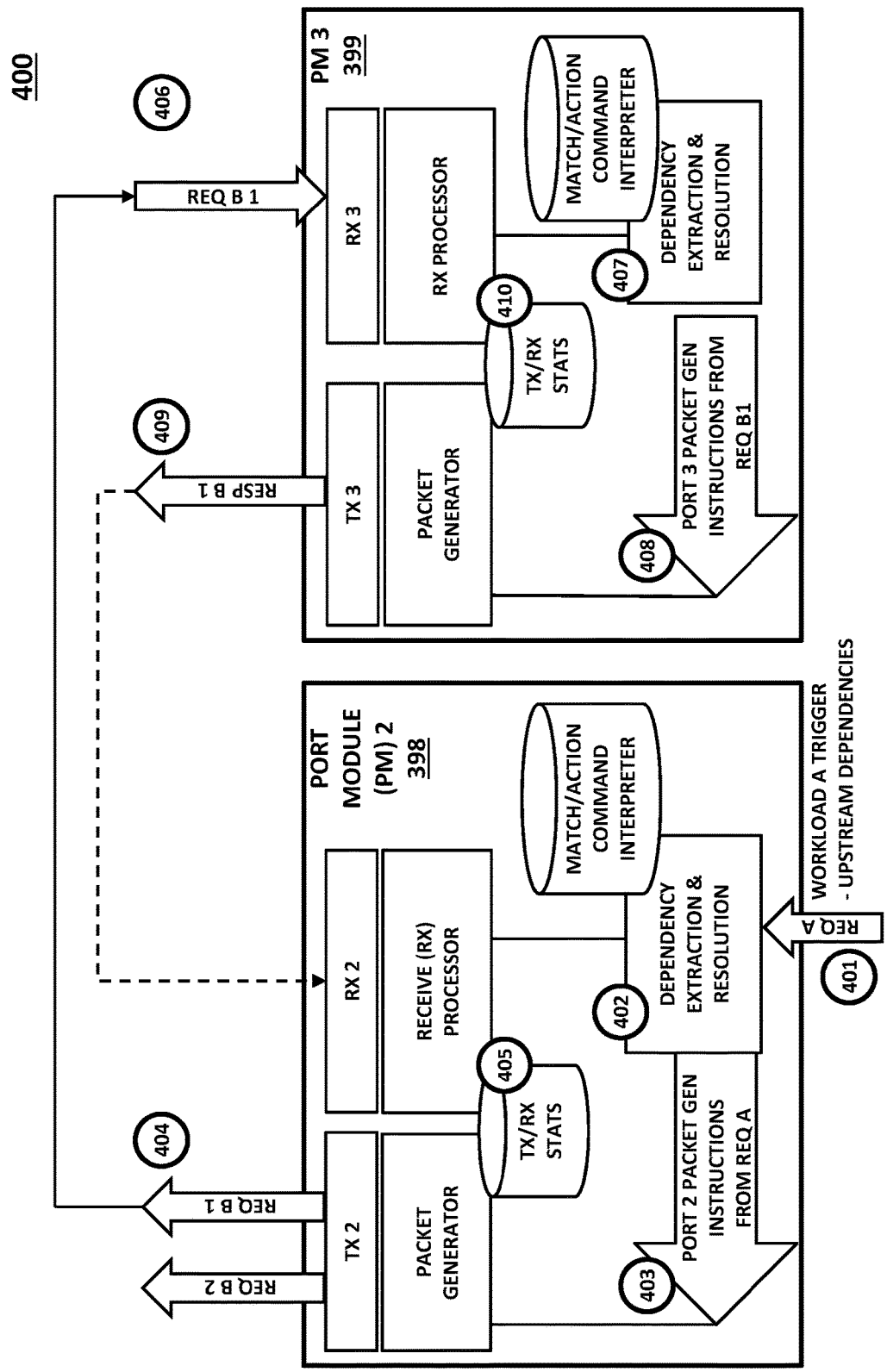
FIG. 4 is a block diagram illustrating an example environment involving two port modules.

FIG. 4 is a block diagram illustrating an example environment 400 involving port module (PM) 2 398 and PM 3 399. In some embodiments, each of PMs 398-399 may represent one or more of ports 110 or aspects described above regarding ports 110. For example, each of PMs 398-399 may include a transmit port and a receive port and may include software and/or hardware based entities for sending, receiving, and/or processing test packets, including generating and storing performance metrics or testing related data.

In some embodiments, each of PMs 398-399 may include a packet generator (e.g., hardware and software) for generating appropriate test traffic, a receive processor for receiving and processing test traffic, and/or functionality for obtaining and interpreting upstream dependency data (e.g., match and action instructions) from received test traffic. In some embodiments, one or more of PM 398-399 may represent or emulate aspects of a node in a data center, e.g., a leaf node or a spine node in a data center with a CLOS fabric based architecture or one or more nodes in another hierarchical architecture.

Referring to FIG. 4, in step 401, a receive port (e.g., RX 2) of PM 398 may receive a request or trigger message associated with a workload A. For example, an initiating request message may be received via an internal communications path from test manager 108. In this example, the initiating request may include upstream dependency data (e.g., match and action instructions).

In step 402, a receive processor of PM 398 may identify upstream dependency data (e.g., match and action instructions and/or packet generation instructions) contained in the request message and interpret that data into one or more test traffic related instructions for another test system port (e.g., a transmit port, like TX 2). In some embodiments, upstream dependency data processing rules may be pre-loaded in a memory accessible to PMs 398-399 or processors thereof, e.g., prior to execution of a test session or related traffic flow.

In step 403, test traffic related instructions (e.g., packet generation and related control instructions) may be sent (e.g., via an internal bus) to a transmit port (e.g., TX 2) of PM 398.

In step 404, the transmit port (e.g., TX 2) or related resources of PM 398 may be configured using test traffic related instructions to generate and send two new request messages associated with workload B to or towards SUT 114 (e.g., a data center node). In some embodiments, the two new request messages may include upstream dependency data different from the message of step 401.

In step 405, the transmit port (e.g., TX 2) or related resources of PM 398 may generate and/or record various statistics or metrics associated with the transmission.

In step 406, one of the two workload B request messages (e.g., Req B1) may be received from SUT 114 at a receive port (e.g., RX 3) of PM 399.

In step 407, a receive processor of PM 399 may identify upstream dependency data (e.g., match and action instructions and/or packet generation instructions) contained in the request message and interpret that data into one or more test traffic related instructions for another test system port (e.g., a transmit port, like TX 3).

In step 408, test traffic related instructions (e.g., packet generation and related control instructions) may be sent (e.g., via an internal bus) to a transmit port (e.g., TX 3) of PM 399.

In step 409, the transmit port (e.g., TX 3) or related resources of PM 399 may be configured using test traffic related instructions to generate and send a response message associated with workload B to or towards SUT 114 (e.g., a data center node), where the response message may eventually be received at a receive port (e.g., RX 2) of PM 398 (where it may be received and processed).

In step 410, the transmit port (e.g., TX 3) or related resources of PM 399 may generate and/or record various statistics or metrics associated with the transmission.

It will be appreciated that FIG. 4 is for illustrative purposes and that different and/or additional steps other than those depicted in FIG. 4 may occur. Further, it will be appreciated that some steps may occur in a different order than depicted in FIG. 4 and that functionality described above in relation to FIG. 4 may be changed, altered, added, or removed.

Figure 5:
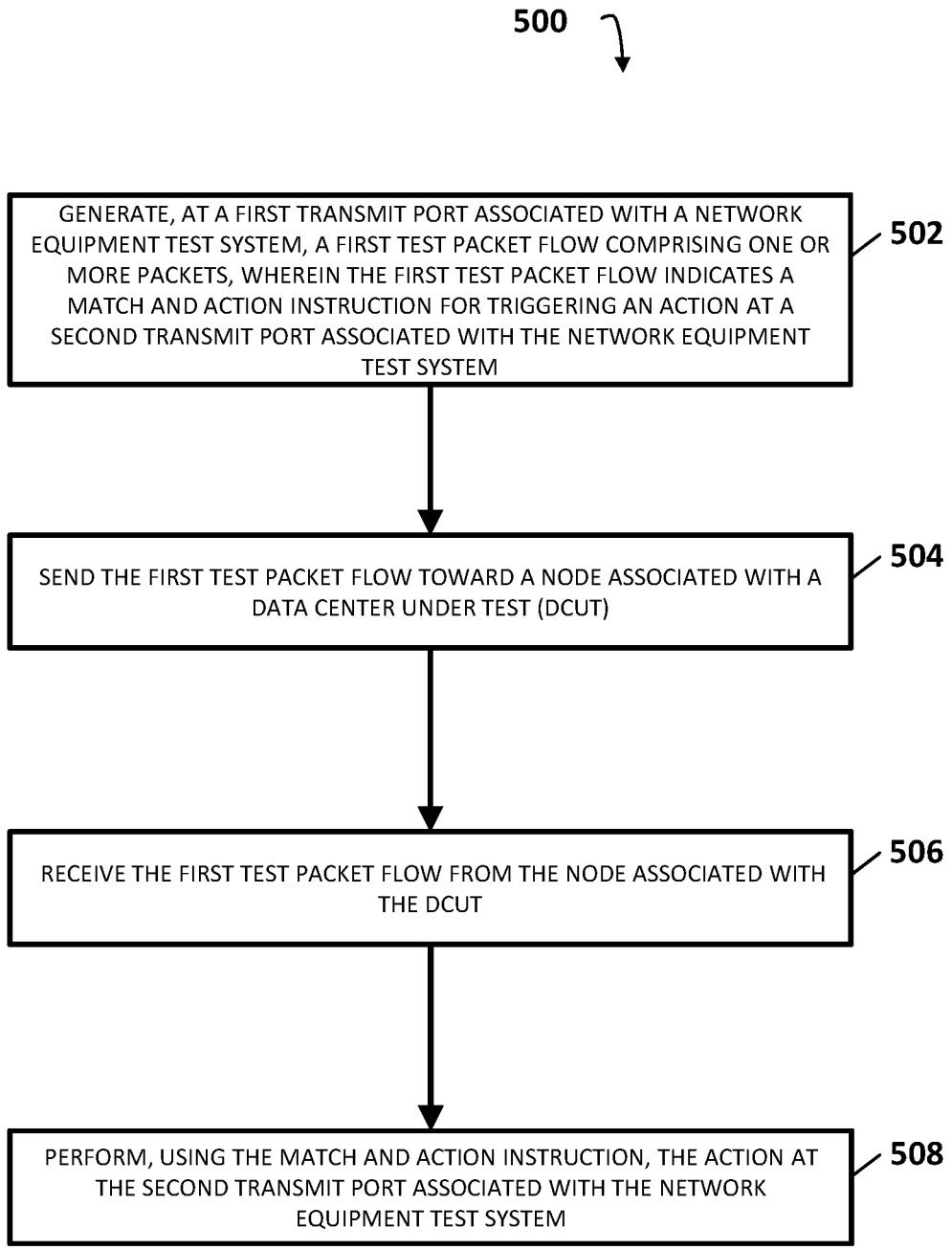
FIG. 5 is a flow chart illustrating an example process for stateless service traffic generation.

FIG. 5 is a diagram illustrating an example process 500 for stateless service traffic generation. In some embodiments, process 500, or portions thereof, may be performed by or at NETS 102, test generator 106, test manager 108, ports 110, and/or another node or module. In some embodiments, process 500 may include steps 502, 504, 506, and/or 508.

Referring to process 500, in step 502, a first test packet flow (e.g., one or more related packets) may be generated at a first transmit port associated with a network equipment test system, wherein the first test packet flow indicates a match and action instruction for triggering an action at a second transmit port associated with the network equipment test system. For example, a test packet may contain a match and action instruction in a packet header and/or a payload portion. In another example, a match and action instruction may be contained in a TCP message, where the TCP message may be split among several packets and the entire TCP message has to be received prior to obtaining and interpreting the match and action instruction.

In some embodiments, one or more test packets may contain an indirect reference (e.g., an instruction set identifier) that indicates a set of instructions (e.g., one or more match and action instructions), where the actual instructions are preconfigured ands stored in a memory of a future hop (e.g., one or more ports 110 of NETS 102).

In some embodiments, a test packet flow (e.g., one or more test packets) may indicate a match and action instruction by having certain characteristics. In such embodiments, NETS 102 or a related entity (e.g., ports 110) may be configured to determine a match and action instruction by determining that certain aspects in one or more test packets (e.g., a TCP port number and a text field in the TCP payload) exist and using predetermined interpretation logic (e.g., from test manager 108) to determine an appropriate action to perform.

In some embodiments, an action triggered may include generating a test packet flow, defining or modifying packet flow characteristics, regulating a test packet flow, corrupting a test packet flow, delaying a test packet flow, or stopping a test packet flow. For example, a match and action instruction may be usable for defining or modifying a 5-tuple (e.g., IP addresses, ports, and application or type), packet size, and inter-packet gap associated with a test traffic flow or portion thereof (e.g., a test packet).

In step 504, the first test packet flow may be sent toward a node associated with a data center under test (DCUT). For example, a node associated with a DCUT may include a server, network switch, a network router, or a network device.

In step 506, the first test packet flow may be received from the node associated with the DCUT.

In step 508, the action may be performed, using the match and action instruction, at the second transmit port associated with the network equipment test system.

In some embodiments, performing an action may include generating a second test packet flow. For example, a second test packet flow may be associated with a device, an application, or a service different from a first test packet flow. In this example, the second test packet flow may indicate a second match and action instruction for a triggering a second action at a transmit port.

In some embodiments, one or more performance metrics associated with a DCUT may be generated using one or more test packets (e.g., test packet flows).

In some embodiments, a network equipment test system may be configured to emulate various characteristics of entities (e.g., devices, functions, applications, and/or services) in a DCUT or a related network by including different match and action instructions in test packets during a test session. Such characteristics may include network and/or application and/or service and/or other entity behavior.

In some embodiments, a network equipment test system may be configured with instruction interpretation logic for interpreting match and action instructions prior to executing the test session, wherein the instruction interpretation logic indicates, for each of the match and action instructions, packet characteristics of a received packet that may be to trigger a response action.

In some embodiments, a network equipment test system may include a NIC, a traffic generator, an FPGA, an ASIC, or a processor. For example, NETS 102 may include a NIC, a traffic generator, an FPGA, an ASIC, and/or a processor.

It will be appreciated that process 500 is for illustrative purposes and that different and/or additional actions may be used. It will also be appreciated that various actions described herein may occur in a different order or sequence.

It should be noted that test manager 108, NETS 102, ports 110, and/or functionality described herein may constitute a special purpose computing device. Further, test manager 108, NETS 102, ports 110, and/or functionality described herein can improve the technological field of network testing by providing various techniques for emulating stateless service traffic (e.g., east-west traffic in a data center) and testing in SUT 114, e.g., one or more nodes in a DCUT. For example, NETS 102 and/or functionality described herein can be used to emulate characteristics of various entities in a DCUT (e.g., devices, applications, or services implemented in a DCUT) by including different match and action instructions in test packets during a test session. In this example, the match and action instructions can act as state information and emulate realistic chaining of services or other scenarios. Further, NETS 102 and/or functionality described herein can use test packets and related measurements to generate performance metrics (e.g., latency) associated with the DCUT or a node therein.

It will be understood that various details of the subject matter described herein may be changed without departing from the scope of the subject matter described herein.

Furthermore, the foregoing description is for the purpose of illustration only, and not for the purpose of limitation, as the subject matter described herein is defined by the claims as set forth hereinafter.

What is claimed is:

1. A method for stateless service traffic generation, the method comprising:
at a network equipment test system:
generating, at a first transmit port associated with the network equipment test system, a first test packet flow comprising one or more packets, wherein the first test packet flow indicates a match and action instruction for triggering an action at a second transmit port associated with the network equipment test system;
sending the first test packet flow toward a node associated with a data center under test (DCUT);
receiving the first test packet flow from the node associated with the DCUT; and
performing, using the match and action instruction, the action at the second transmit port associated with the network equipment test system, wherein performing the action includes generating a second test packet flow and the second test packet flow is associated with a device, an application, or a service different from a device, an application, or a service associated with the first test packet flow.

2. The method of claim 1 comprising:
generating one or more performance metrics associated with the DCUT using the first test packet flow or subsequent test packets.

3. The method of claim 1 wherein the network equipment test system is configured to emulate characteristics of devices, applications, or services in the DCUT by indicating different match and action instructions in one or more test packet flows during a test session.

4. The method of claim 3 wherein the network equipment test system is configured with instruction interpretation logic for interpreting the match and action instructions prior to executing the test session, wherein the instruction interpretation logic indicates, for each of the match and action instructions, packet characteristics of a received packet that is to trigger a response action.

5. The method of claim 1 wherein the second test packet flow indicates a second match and action instruction for triggering a second action at the first transmit port or a third transmit port.

6. The method of claim 1 wherein the action triggered includes generating a test packet flow, defining or modifying packet flow characteristics, regulating a test packet flow, corrupting a test packet flow, delaying a test packet flow, or stopping a test packet flow.

7. The method of claim 1 wherein the network equipment test system includes a network interface card (NIC), a traffic generator, a field programmable gate array (FPGA), an application-specific integrated circuit (ASIC), or a processor.

8. A system for stateless service traffic generation, the system comprising:
at least one processor; and
a network equipment test system implemented using the at least one processor, the network equipment test system configured for:
generating, at a first transmit port associated with the network equipment test system, a first test packet flow comprising one or more packets, wherein the first test packet flow indicates a match and action instruction for triggering an action at a second transmit port associated with the network equipment test system;
sending the first test packet flow toward a node associated with a data center under test (DCUT);
receiving the first test packet flow from the node associated with the DCUT; and
performing, using the match and action instruction, the action at the second transmit port associated with the network equipment test system, wherein performing the action includes generating a second test packet flow and the second test packet flow is associated with a device, an application, or a service different from a device, an application, or a service associated with the first test packet flow.

9. The system of claim 8 comprising:
generating one or more performance metrics associated with the DCUT using the first test packet flow or subsequent test packets.

10. The system of claim 8 wherein the network equipment test system is configured to emulate characteristics of devices, applications, or services in the DCUT by including different match and action instructions in one or more test packet flows during a test session.

11. The system of claim 10 wherein the network equipment test system is configured with instruction interpretation logic for interpreting the match and action instructions prior to executing the test session, wherein the instruction interpretation logic indicates, for each of the match and action instructions, packet characteristics of a received packet that is to trigger a response action.

12. The system of claim 8 wherein the second test packet flow indicates a second match and action instruction for triggering a second action at the first transmit port or a third transmit port.

13. The system of claim 8 wherein the action triggered includes generating a test packet flow, defining or modifying packet flow characteristics, regulating a test packet flow, corrupting a test packet flow, delaying a test packet flow, or stopping a test packet flow.

14. The system of claim 8 wherein the network equipment test system includes a network interface card (NIC), a traffic generator, a field programmable gate array (FPGA), an application-specific integrated circuit (ASIC), or a processor.

15. A non-transitory computer readable medium having stored thereon executable instructions that when executed by at least one processor of at least one computer cause the at least one computer to perform steps comprising:
at a network equipment test system:
generating, at a first transmit port associated with the network equipment test system, a first test packet flow comprising one or more packets, wherein the first test packet flow indicates a match and action instruction for triggering an action at a second transmit port associated with the network equipment test system;
sending the first test packet flow toward a node associated with a data center under test (DCUT);
receiving the first test packet flow from the node associated with the DCUT; and
performing, using the match and action instruction, the action at the second transmit port associated with the network equipment test system, wherein performing the action includes generating a second test packet flow and the second test packet flow is associated with a device, an application, or a service different from a device, an application, or a service associated with the first test packet flow.

16. The non-transitory computer readable medium of claim 15 comprising:
generating one or more performance metrics associated with the DCUT using the first test packet flow or subsequent test packets.

\* \* \* \* \*

UNITED STATES PATENT AND TRADEMARK OFFICE
CERTIFICATE OF CORRECTION

| | | |
|---|---|---|
| PATENT NO. | : 11,621,908 B2 | Page 1 of 1 |
| APPLICATION NO. | : 17/319872 | |
| DATED | : April 4, 2023 | |
| INVENTOR(S) | : Winston Wencheng Liu et al. | |

It is certified that error appears in the above-identified patent and that said Letters Patent is hereby corrected as shown below:

In the Specification

In Column 1, Line 9, delete "20," and insert -- 30, --.

In Column 1, Line 10, delete "2020 10033," and insert -- 2020 00399, --.

Signed and Sealed this
Twelfth Day of September, 2023

*Katherine Kelly Vidal*

Katherine Kelly Vidal
*Director of the United States Patent and Trademark Office*